United States Patent
Brehmer et al.

(10) Patent No.: US 7,963,250 B2
(45) Date of Patent: Jun. 21, 2011

(54) ANIMAL FEEDER

(76) Inventors: Joey Rey Brehmer, Lyons, NE (US);
John Philip O'Mara, McCook Lake, SD (US); Jamie Charles Brehmer, Lyons, NE (US)

( * ) Notice: Subject to any disclaimer, the term of this patent is extended or adjusted under 35 U.S.C. 154(b) by 264 days.

(21) Appl. No.: 12/381,745

(22) Filed: Mar. 16, 2009

(65) Prior Publication Data
US 2010/0229799 A1     Sep. 16, 2010

(51) Int. Cl.
*A01K 39/04* (2006.01)
(52) U.S. Cl. .............. 119/51.5; 119/53; 119/54
(58) Field of Classification Search .......... 119/51.5, 119/51.01, 52.1, 53, 53.5, 54, 55; 222/129
See application file for complete search history.

(56) References Cited

U.S. PATENT DOCUMENTS

| | | | | |
|---|---|---|---|---|
| 3,037,481 | A | * | 6/1962 | Kloss ............................... 119/71 |
| 4,977,858 | A | * | 12/1990 | Langballe et al. ........... 119/51.5 |
| 6,923,142 | B2 | | 8/2005 | Kleinsasser |
| 6,957,627 | B1 | | 10/2005 | Knippelmeir |

FOREIGN PATENT DOCUMENTS
JP          04094627 A   *  3/1992
* cited by examiner

*Primary Examiner* — Rob Swiatek
*Assistant Examiner* — Kristen C Hayes
(74) *Attorney, Agent, or Firm* — Dennis L. Thomte; Thomte Patent Law Office LLC

(57) ABSTRACT

An animal feeder which is adapted to simultaneously dispense feed and liquid onto a feed material receiving member.

6 Claims, 7 Drawing Sheets

ANIMAL FEEDER

BACKGROUND OF THE INVENTION

1. Field of the Invention

This invention relates to an animal feeder and more particularly relates to an animal feeder which simultaneously dispenses feed and water onto a feed receiving member such as a trough, shelf, etc.

2. Description of the Related Art

Many types of animal or livestock feeders have been previously provided to enable animals such as hogs, etc., to consume feed in either a dry or wet manner. One popular type of feeder is known as a shelf feeder. In a shelf feeder, a horizontally disposed and vertically adjustable shelf is positioned below the discharge opening of a feed hopper. The animal may eat the feed on the shelf in a dry condition or nudge the feed from the shelf downwardly into a trough positioned beneath the shelf. The prior art shelf feeder commonly has a plurality of water nozzles positioned above the trough and below the shelf and may be actuated by the animal to discharge water onto the feed in the trough. In other words, the shelf feeder of the prior art does not simultaneously dispense feed and water. In the prior art shelf feeder, the animal frequently causes too much water to be discharged from the water nozzle(s) which results in the feed being overly wet which results in feed wastage and spoilage since the animal is not attracted to overly wet feed. The overly wet feed, when left in the trough, becomes stale or spoiled which discourages the animal from consuming feed in the trough.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An animal feeder is described which simultaneously dispenses feed and water onto a feed receiving member such as a shelf or feed trough. The feeder comprises a hopper, having upper and lower ends, for containing a feed material to be dispensed to an animal. The hopper has a discharge opening at its lower end through which the feed material may pass. The feed material receiving member is positioned below the discharge opening. The feeder includes a selectively adjustable feed gate, having upper and lower ends, at the discharge opening of the hopper for selectively adjusting the amount of feed material which may pass through the discharge opening of the hopper onto the feed material receiving member. A source of liquid is positioned above the feed material receiving member. The feeder includes means for simultaneously causing the feed material and liquid to be deposited or dispensed onto the feed material receiving member for consumption by the animal.

The source of liquid comprises a horizontally extended elongated hollow tube or U-shaped tray. If the source of liquid is a tube, it has an upper wall in which one or more openings are formed so that liquid in the tube may be discharged outwardly from the opening so as to drop therefrom onto the feed material receiving member. The feeder includes means for selectively varying the level of the liquid in the tube. A movable paddle extends downwardly into the opening in the tube which when moved, causes liquid to be splashed outwardly through the opening in the tube onto the feed material receiving member. The feeder includes a feed agitator which is movably mounted at the discharge opening of the hopper, which causes feed material to pass from the discharge opening in the hopper when moved. The feed agitator and the paddle are interconnected with a movable actuator positioned above the feed material receiving member so that movement of the actuator by an animal causes feed material and liquid to be simultaneously deposited or dispensed onto the feed material receiving member. In the preferred embodiment, the feed material receiving member is a trough but could be a shelf or other member suitably designed to receive feed thereon.

It is therefore a principal object of the invention to provide an improved animal feeder.

A further object of the invention is to provide an animal feeder which simultaneously dispenses feed and water onto a feed material receiving member.

A further object of the invention is to provide a feeder of the type described which does not dispense an excess of water onto the feed being dispensed onto the feed material receiving member.

A further object of the invention is to provide a feeder which discourages feed waste.

A further object of the invention is to provide a feeder which reduces, if not eliminates, the collection of stale or spoiled feed on the feed material receiving member.

A further object of the invention is to provide an animal feeder of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
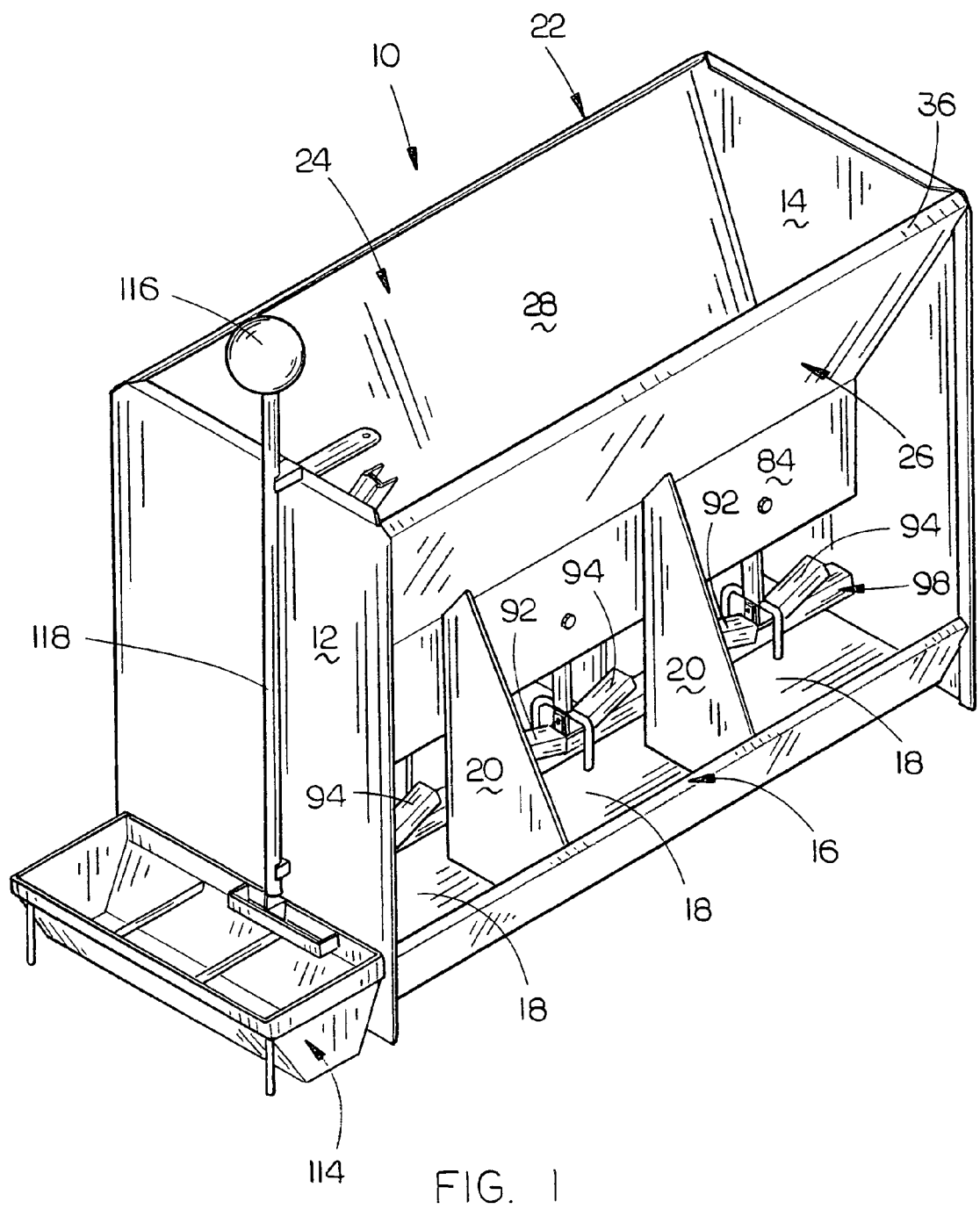
FIG. 1 is a perspective view of the animal feeder of this invention.
Figure 2:
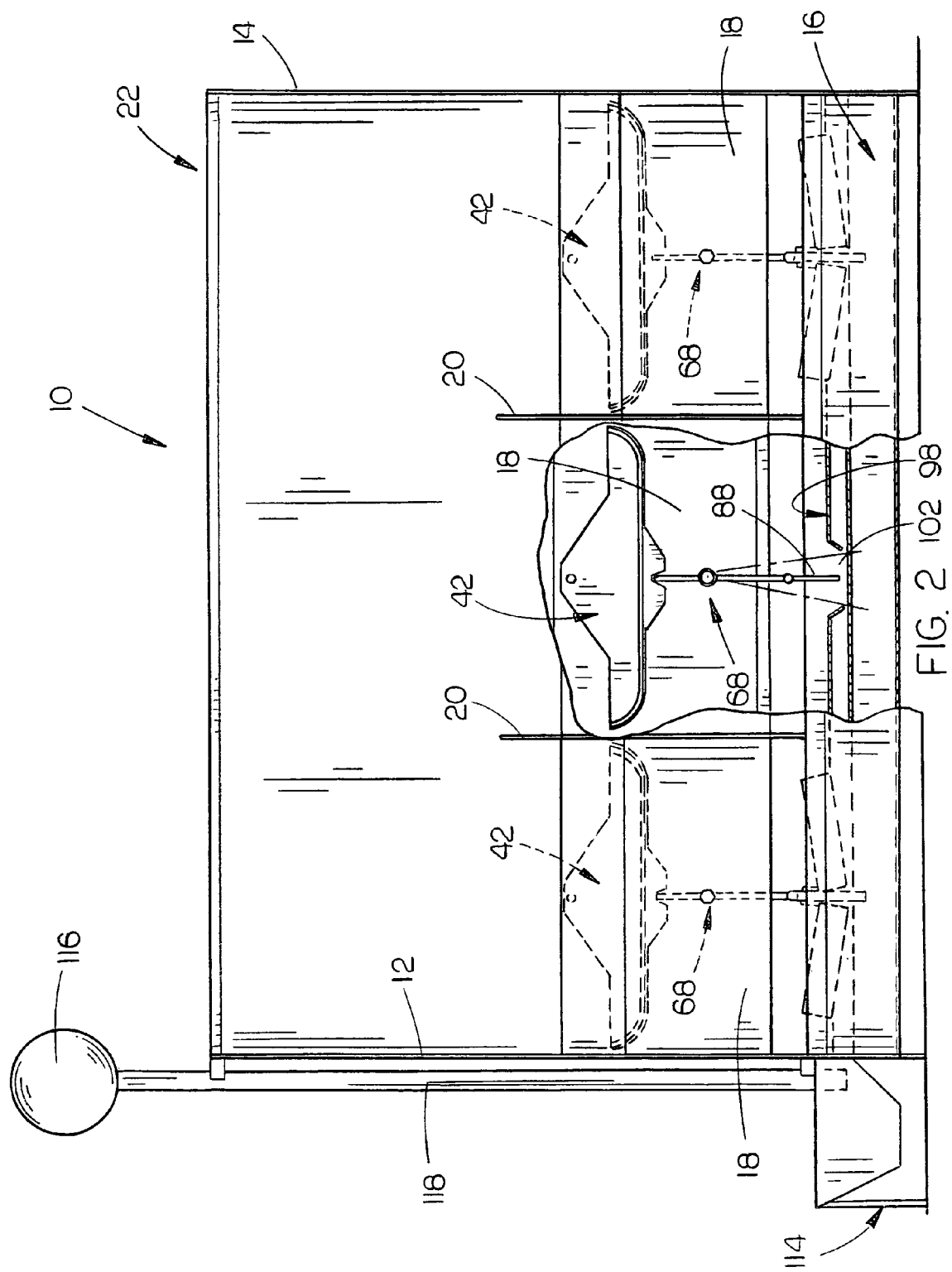
FIG. 2 is a side elevational view of the feeder of FIG. 1 with portions thereof cut-away to more fully illustrate the invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The animal feeder of this invention is referred to generally by the reference numeral 10. Feeder 10 includes end walls 12 and 14 having upper and lower ends. A feed material receiving member 16 extends between the lower ends of end walls 12 and 14. In the drawings, the member 16 is depicted as a trough but the member 16 could be a shelf or other structure capable of having feed material deposited therein or thereon to enable an animal to consume the feed material therein or thereon. Feeder 10 may be a single feeder at one side thereof or have a plurality of feed compartments 18 at each side thereof formed by divider walls 20.

Figure 3:
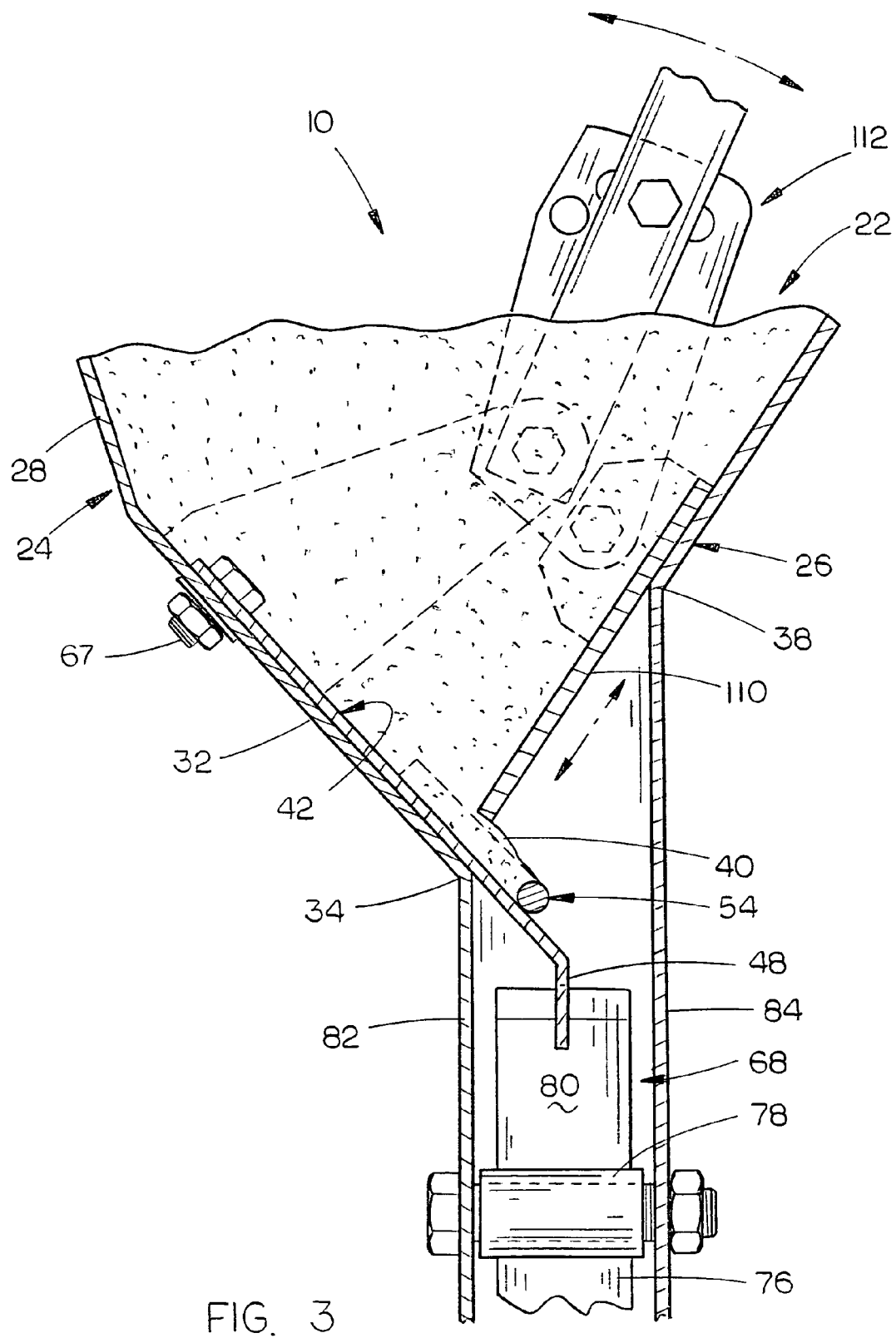
FIG. 3 is a partial sectional view of the feeder of FIG. 1.
Figure 4:
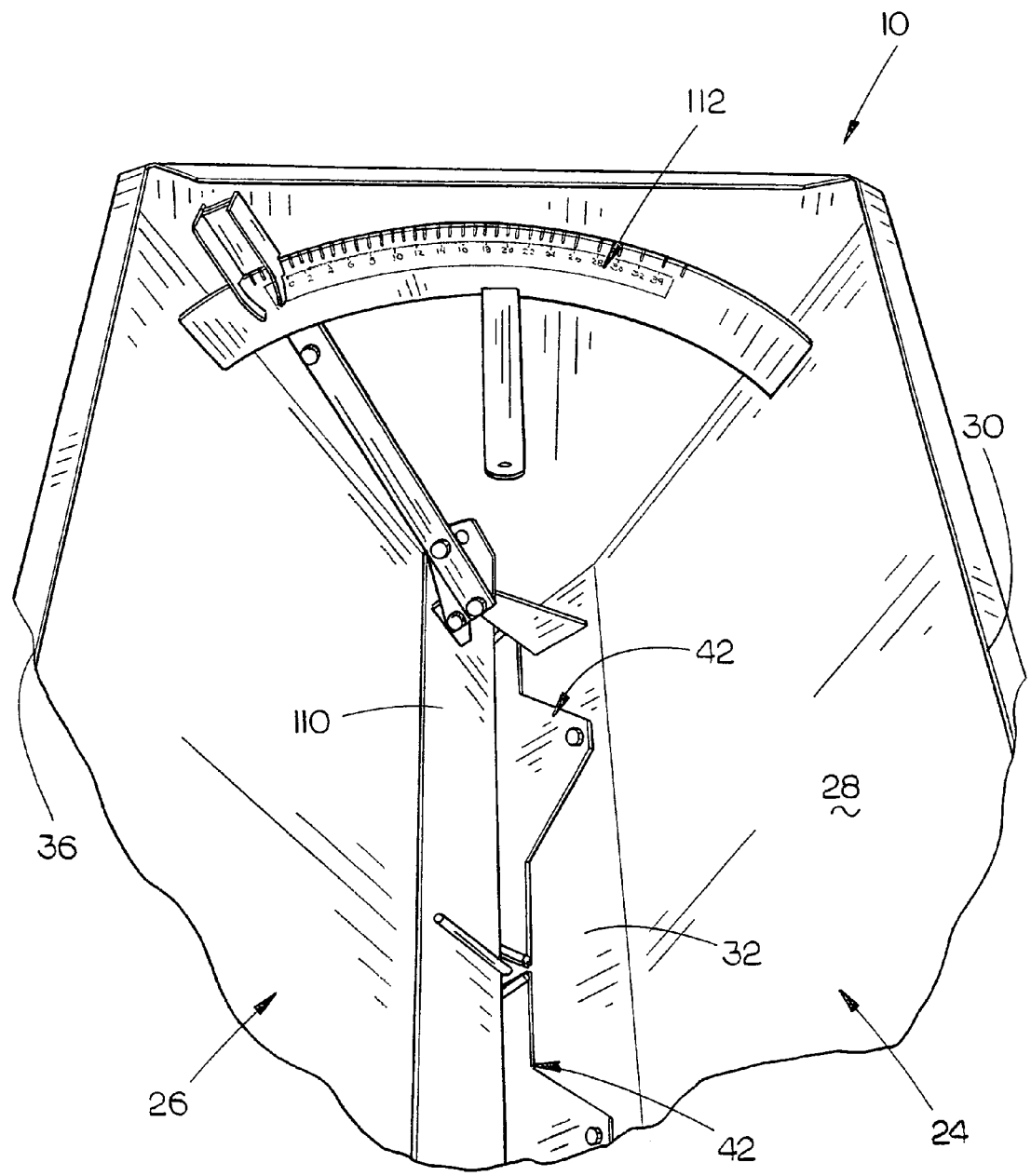
FIG. 4 is a partial perspective view of the means for selectively adjusting the feed gate.
Figure 5:
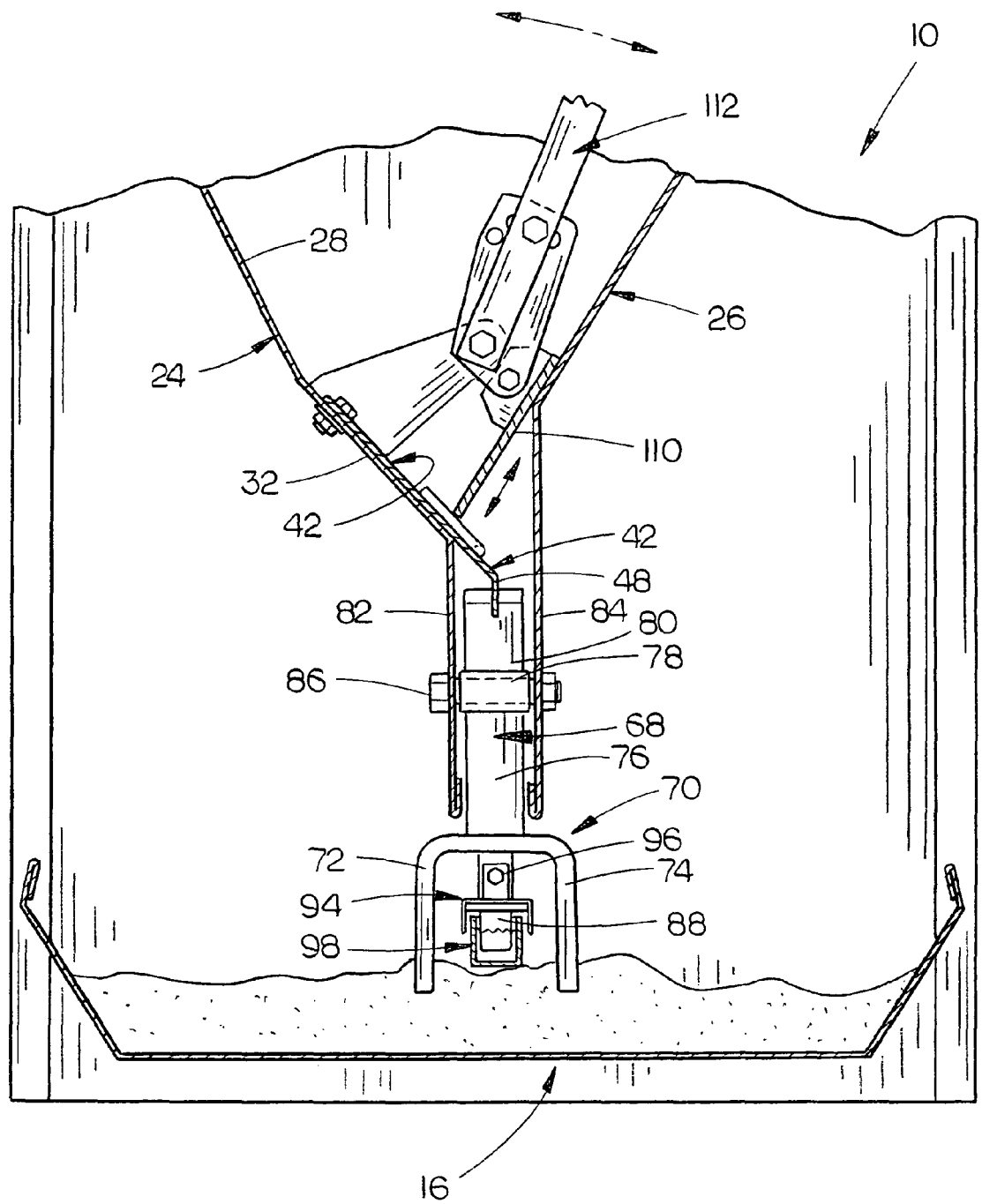
FIG. 5 is a partial sectional view of the feed and liquid dispensing mechanisms of this invention.
Figure 6:
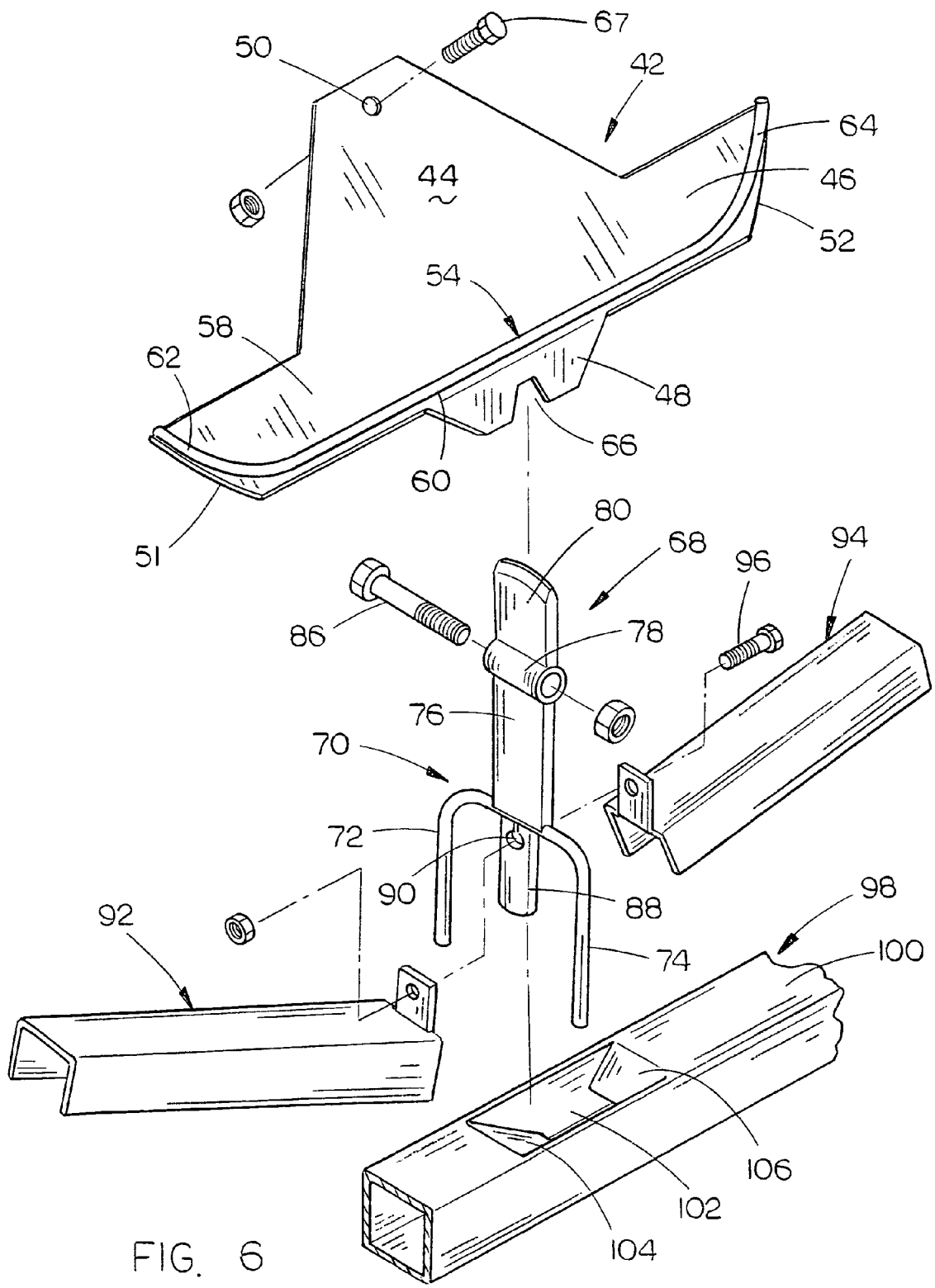
FIG. 6 is a partial exploded perspective view of the feed and liquid dispensing mechanism of this invention.
Figure 7:
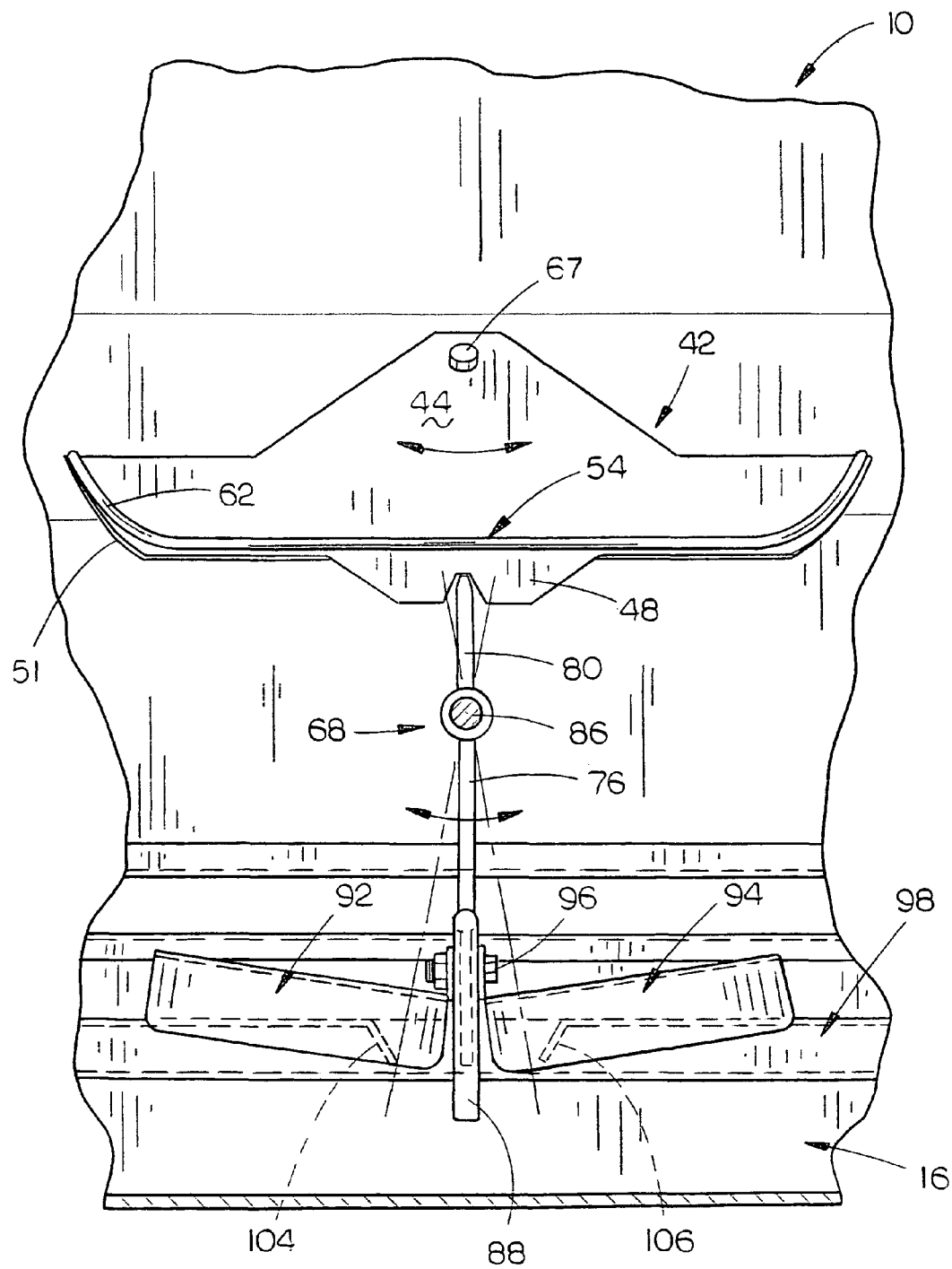
FIG. 7 is a partial side view of the feeder of this invention.

Feeder 10 includes a generally V-shaped hopper 22 defined by wall members 24 and 26 extending between end walls 12 and 14. For purposes of description, wall member 24 will be described as having an upper wall portion 28, with an upper end 30, and a lower wall portion 32, with a lower end 34. As seen in FIG. 3, upper wall portion 28 and lower wall portion 32 are angularly disposed with respect to one another. Wall member 26 will be described as having an upper end 36 and a lower end 38. The lower end 38 of wall member 26 is spaced from the lower end 34 of lower wall portion 32 of wall member 24 to define a discharge opening 40 therebetween.

The numeral 42 refers to an agitator plate which is pivotally mounted to lower end wall portion 32 of wall member above each of the feed compartments. Each agitator plate 42 includes a generally V-shaped upper plate portion 44, an intermediate plate portion 46 and a lower plate portion 48, which is disposed at an angle with respect to intermediate plate portion 46. Upper plate portion 44 is provided with an opening 50 formed therein. The intermediate plate portion 46 has angled ends 51 and 52. Intermediate plate portion 46 has a feed retaining member in the form of a rod 54 welded to the upper surface 58 of plate portion 46 to provide a feed retaining member having a base portion 60 at end portions 62 and 64. Lower end plate portion 48 has a generally inverted V-shaped notch 66 formed therein. The agitator plate 42 is pivotally secured to lower wall portion 32
by a bolt 67 extending through lower wall portion 32 and opening 50 of agitator plate 42.

The numeral 68 refers to an actuator including an inverted U-shaped yoke 70 having spaced-apart actuator members or legs 72 and 74 at the lower end thereof. Bar or plate 76 has its lower end welded to the upper end of yoke 70 and has its upper end welded to a collar, sleeve or tube 78. The lower end of plate or bar 80 is welded to tube 78. Actuator 68 is pivotally connected to a pair of spaced-apart wall members 82 and 84, which are secured to wall members 24 and 26 respectively by means of pin or bolt 86 extending through wall member 82, tube 78 and wall member 84. The upper end of bar 76 is movably received by the notch 66 in the associated agitator plate. Paddle 88 is secured to yoke 70 and extends downwardly therefrom between actuator members 72 and 74 of yoke 70.

Paddle 88 has a bolt opening 90 formed therein. A pair of channel members or shields 92 and 94 are bolted to paddle 88 by bolt 96 at opposite sides thereof. As seen, channel members 92 and 94 extend outwardly and upwardly from opposite sides of paddle 88.

The numeral 98 refers to a liquid supply conduit tube or U-shaped tray. If the conduit is a tube, it has a top wall 100 which has an elongated opening 102 formed therein at each compartment 18. Portions of the top wall 100 are bent downwardly to provide splash plates 104 and 106 at the opposite ends of the opening 102. A paddle 88 is movably positioned in each of the openings 102 so as to extend downwardly into the interior of the tube 98. When paddle 88 is moved rapidly in the opening 102, liquid in the tube 98 will be directed onto the splash plates 104 and 106 and splashed out of the tube 98.

The numeral 110 refers to an elongated, flat feed metering plate or gate 110 which is selectively movably mounted adjacent wall 26 at the lower end thereof for selectively adjusting the discharge opening 40 to control the rate of feed being discharged from the hopper 22. A feed gate control means 112 is operatively connected to each end of the gate 110 for raising and lowering gate 110.

One end of tube 98 is in fluid communication with a liquid tray 114 positioned at one end of the feeder 10. Tray 114 will normally be covered by a cover to prevent the animals from drinking from the tray 114. The liquid level in tray 114 is adjustably controlled by a conventional vacuum water or liquid valve 116 having a liquid conduit 118 extending downwardly to tray 114. The valve 116 is of the type manufactured by Rotecna S. A., Poligono Industrial Nave 3,25310 Agramunt (Lleida) Spain. Valve 116 is in communication with a source of water or other liquid and controls the level of liquid in tray 114, which controls the liquid level in tube 98, which controls the amount of liquid which will be splashed therefrom through the openings 102. Conduit 118 could be directly connected to one end of tube 98 with the tray 114 being positioned at the other end of the tube 98.

In operation, the valve 116 or other control means will be adjusted so that the desired liquid level in tray 114 is achieved. Hopper 22 will be filled with feed material and gate 110 will be adjusted so as to achieve the desired feed flow downwardly through discharge opening 40. The feed will flow downwardly through the discharge opening 40 until it is restrained by the rod 54. When an animal moves the yoke 70 laterally, the actuator 68 pivotally moves about bolt 86 which causes bar 80 to pivotally move the agitator plate 42 which causes some of the feed on the agitator plate 42 to fall downwardly onto the feed receiving member 16. The channels 92 and 94 move with paddle 88 and prevent feed from falling downwardly into the opening 102. The pivotal movement of actuator 68 causes paddle 88 to move back and forth in the liquid in tube 98 which causes the liquid in tube 98 to be splashed onto the splash plates 104 and 106 and splashed out of the tube 98 through the opening 102 and then fall downwardly onto the feed receiving member 16. The liquid from the tube 98 is simultaneously dispensed from the tube 98 with the dispensing of feed onto the member 16 so that the feed is not overly wetted thereby reducing feed waste and spoilage.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An animal feeder, comprising:
a hopper, having upper and lower ends, for containing a feed material to be dispensed to an animal;
said hopper having a discharge opening at its said lower end through which the feed material may pass;
a feed material receiving member positioned below said discharge opening;
a selectively adjustable feed gate, having upper and lower ends, at said discharge opening for selectively adjusting the amount of feed material which may pass through said discharge opening onto said feed material receiving member;
a source of liquid positioned above said feed material receiving member;

and an animal actuated mechanism which simultaneously causes feed material and liquid to be deposited onto said feed material receiving member for consumption by the animal.

2. The animal feeder of claim 1 wherein said source of liquid comprises a horizontally extending elongated hollow tube having an upper wall in which an opening is formed so that liquid in said tube may be discharged outwardly from said opening so as to drop therefrom onto said feed material receiving member.

3. The animal feeder of claim 2 further including means for selectively varying a level of the liquid in said tube.

4. The animal feeder of claim 2 wherein said animal actuated mechanism includes a movable paddle extending downwardly into said opening in said tube which when moved causes liquid to be splashed outwardly through said opening in said tube.

5. The animal feeder of claim 4 wherein said animal actuated mechanism includes a feed agitator which is movably mounted at said discharge opening of said hopper, which causes feed material to pass from said discharge opening in said hopper when moved, said feed agitator and said paddle being interconnected with a movable actuator positioned above said feed material receiving member so that movement of the actuator by an animal causes feed material and liquid to be simultaneously deposited onto said feed material receiving member.

6. The animal feeder of claim 4 wherein said tube has splash plates extending downwardly into said opening in said tube.

* * * * *